US005398402A

United States Patent [19]

Valencic et al.

[11] Patent Number: 5,398,402

[45] Date of Patent: * Mar. 21, 1995

[54] METHOD OF REPAIRING A TRANSFORMER HAVING A REPAIRABLE AMORPHOUS METAL TRANSFORMER JOINT

[75] Inventors: Milan D. Valencic, Athens, Ga.; Ram R. P. Sinha, Laurel, Mich.

[73] Assignee: ABB Power T&D Company Inc., Blue Bell, Pa.

[ * ] Notice: The portion of the term of this patent subsequent to Jan. 16, 2007 has been disclaimed.

[21] Appl. No.: 806,114

[22] Filed: Dec. 12, 1991

Related U.S. Application Data

[62] Division of Ser. No. 250,470, Sep. 28, 1988, Pat. No. 5,083,360.

[51] Int. Cl.[6] .......................... H01F 7/06; B23P 6/00

[52] U.S. Cl. .......................................... 29/606; 29/609; 29/402.03; 29/402.08

[58] Field of Search ................ 29/402.03, 402.08, 605, 29/606, 609; 336/212, 213, 216, 217, 234

[56] References Cited

U.S. PATENT DOCUMENTS 4,893,400 1/1990 Chenoweth .......................... 29/606

*Primary Examiner*—P. W. Echols

*Attorney, Agent, or Firm*—Ostrolenk, Faber, Gerb & Soffen

[57] ABSTRACT

Disclosed is a method of making a repairable transformer having an amorphous metal core. The three uncut legs of an annealed wound amorphous metal core are covered with an adhesive material while leaving the cut leg and both adjoining radii covered, but not bonded. The core joint is opened and coils are placed over the legs that adjoin the cut leg. The core joint is closed and the edges of the joint and both adjoining radii are covered with an inner layer of porous material which is secured by an outer wrap of electrical grade steel. The resulting transformer can be easily repaired by unwrapping away the porous material that covers the cut leg and the adjoining radii, opening the core joint, replacing a defective coil or core, reclosing the core joint, and rewrapping the porous material and reclosing the outer layer of electrical grade steel.

4 Claims, 3 Drawing Sheets

METHOD OF REPAIRING A TRANSFORMER HAVING A REPAIRABLE AMORPHOUS METAL TRANSFORMER JOINT

This is a division of application Ser. No. 07/250,470, filed Sep. 28, 1988, now U.S. Pat. No. 5,083,360.

TECHNICAL FIELD

The invention relates to transformers having amorphous metal cores, and particularly to such transformers having wound rectangular cores with one cut leg containing a core joint.

BACKGROUND OF THE INVENTION

Despite its high cost, amorphous metal is gradually replacing electrical grade steel in transformer cores because it is a lower loss material. A wound core transformer can be made from amorphous metal by winding an amorphous metal sheet into a core over a two-piece inside mandrel or core support, cutting one leg of the core, and forming the metal into a rectangular shape. A piece of electrical grade steel may be wrapped around the outer periphery of the amorphous metal core. The amorphous metal is then annealed, which converts it into a very brittle material. At this point, the core, except for the cut leg, may be protected by the application of a resinous coating. The cut leg is opened, the coils are placed over the two long legs of the core, and the cut leg is closed. The joint is then sealed, using glass cloth and a UV curable resin. In sealing the cut leg, a glass cloth is wrapped and a UV curable resin is applied to seal the structure by the "fit" and "cure" method. This method is time-consuming, costly, and labor-intensive. (See, for example, copending U.S. patent application Ser. No. 079,854, filed Jul. 30, 1987, entitled PREPARATION 0F AMORPHOUS METAL CORE FOR USE IN TRANSFORMER, now U.S. Pat. No. 4,892,773, and U.S. patent application Ser. No. 087,929, entitled REPAIRABLE TRANSFORMER HAVING AMORPHOUS METAL CORE, now U.S. Pat. No. 4,893,400 herein incorporated by reference.) The final assembly is accomplished by placing the core with the coils mounted over its legs into a tank of oil where it is tested at high voltage. If the transformer fails due to a defect in one of the coils, however, the core must be scrapped because the amorphous metal core cannot be disassembled without damage. While the percentage of defective transformers is very low, the high cost of the amorphous metal cores or coils means that a significant loss is incurred when a core or coil must be scrapped.

DISCLOSURE OF THE INVENTION

It is an object of the present invention to make transformers having amorphous metal cores so that a defective coil or core of the transformer can be easily repaired or replaced.

It is another object of the present invention to provide an economical method of manufacturing or repairing transformers having amorphous metal cores.

We have discovered that transformers having amorphous metal cores can be produced in such a way that the core or coils can be repaired or replaced without damage to the amorphous metal core. In this invention, the amorphous metal core is encapsulated on three sides to increase the structural strength of the core and to prevent the escape of fragments from the core.

The amorphous metal core is prepared by coating the three legs with an encapsulating adhesive-implemented substrate such as a UV curable resin. The encapsulating substrate covers the three legs of the transformer, except for the cut leg. This permits the opening of the joint. Porous material, such as woven cotton cloth or paper, is bonded to the end of the amorphous metal core. The porous material is free, except for the portion that is bonded to the resin. The joint is opened and coils are placed over the two long legs. The joint is then closed except for the outer wrap. The porous material is folded over the joint and secured into position. An additional piece of porous material is placed through the window of the core and is wrapped around the core and secured into position. The outer wrap, such as electrical grade steel, is generally disposed around the transformer core. The outer layer is closed around the core joint and tack-welded to secure the outer layer to the transformer core.

Thus, if a transformer made according to this invention is tested at high voltage and is found to contain a defective coil, the protective covering over the cut leg and the adjacent radii can be easily removed without damaging the amorphous metal core. The cut leg can be opened to permit the replacement of the defective coil. The cut leg is reclosed and is resealed. It is therefore no longer necessary to discard an expensive amorphous metal core when it is assembled with a defective coil.

BRIEF DESCRIPTION OF THE DRAWINGS

The invention will become more apparent by reading the following detailed description in conjunction with the drawings, which are shown by way of example only, wherein.

DESCRIPTION OF THE PREFERRED EMBODIMENTS

Figure 1:
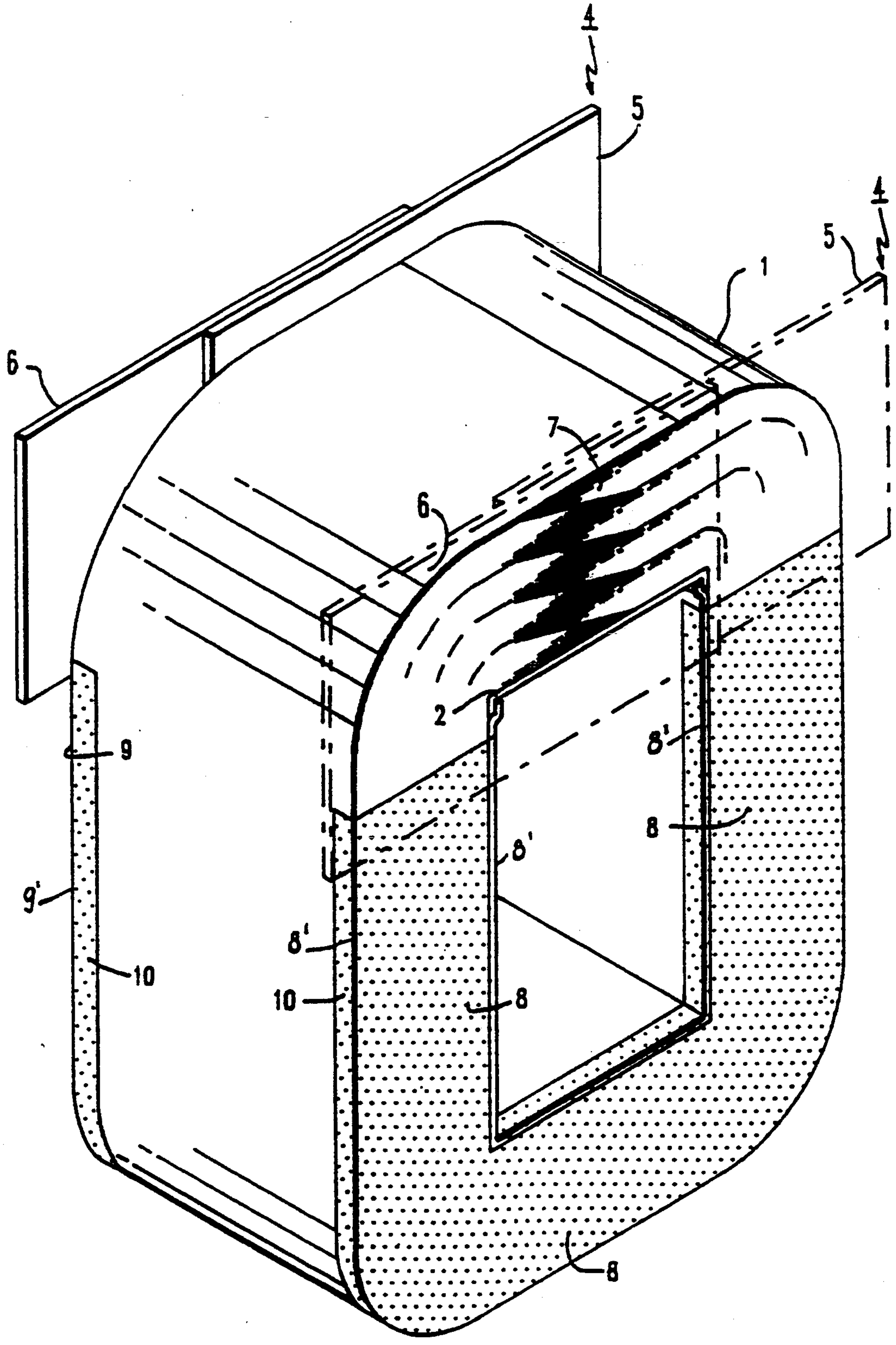
FIG. 1 is an isometric view showing a certain presently preferred embodiment of an amorphous metal core in an early stage of preparation according to the method of this invention.

FIG. 1 shows an amorphous metal core 1. A single core 1 is shown for purposes of illustration. However, multiple cores may be used in this invention. The core 1 is formed over a carbon steel mandrel 2. A first porous material 4 is applied to a portion of the core 1. Two sections, 5, 6, of the porous material are placed on the core 1 so that they overlap in general proximity to the window of the core. The core 1 has been pressed into a rectangular shape and annealed after legs 7 are cut through. The sides 8 and 9 of the remaining legs of the core are covered with an adhesive-impregnated substrate 10, which extends over the sides 8 and 9 including the respective edges 8' and 9' thereof and is cured to bond to the sides of the core and to the first porous material 4 that is in contact with the substrate 10.

Figure 2:
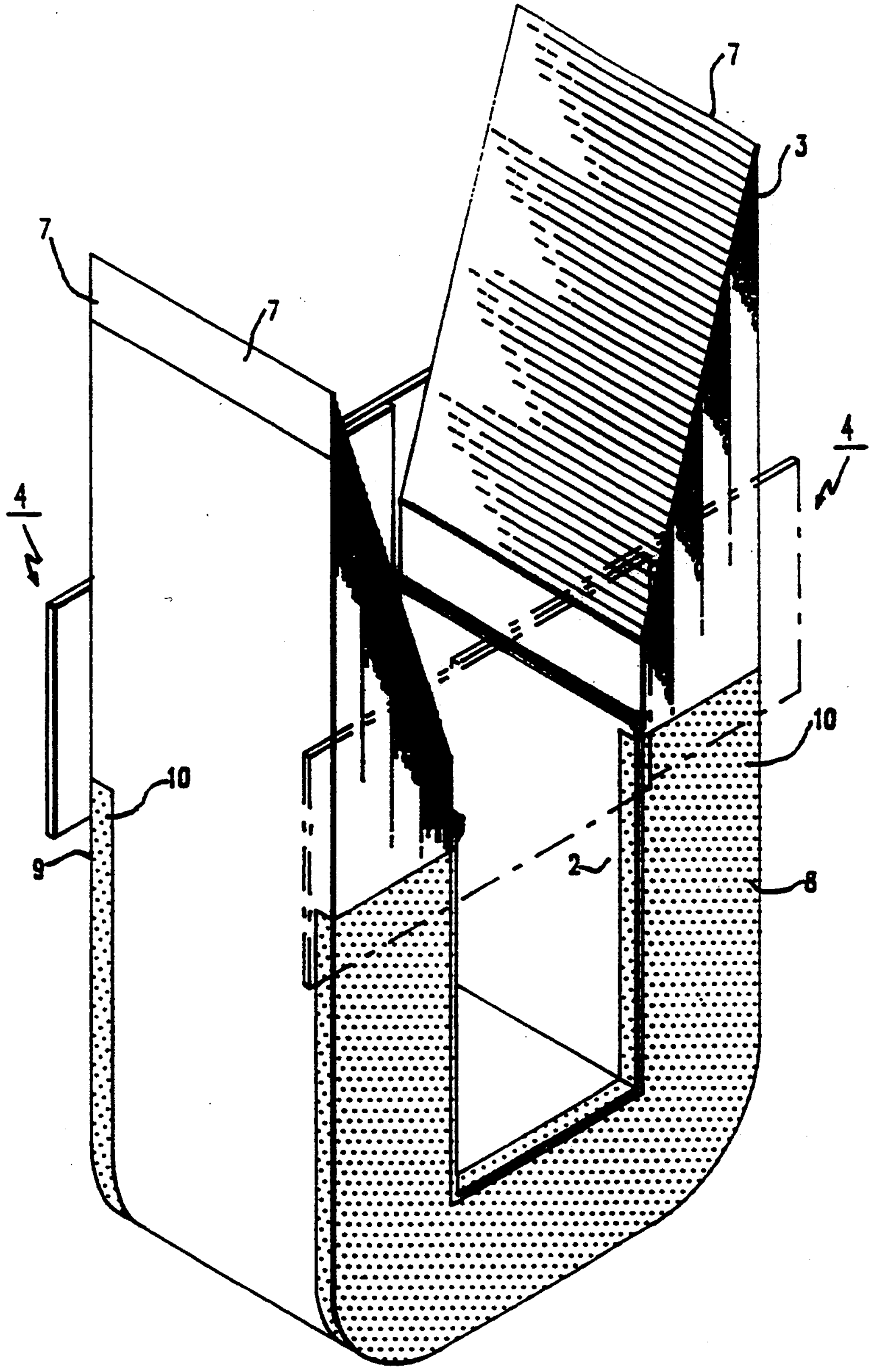
FIG. 2 is an isometric view showing the core of FIG. 1 with the cut leg open for the placement of coils over the two long legs.
Figure 3:
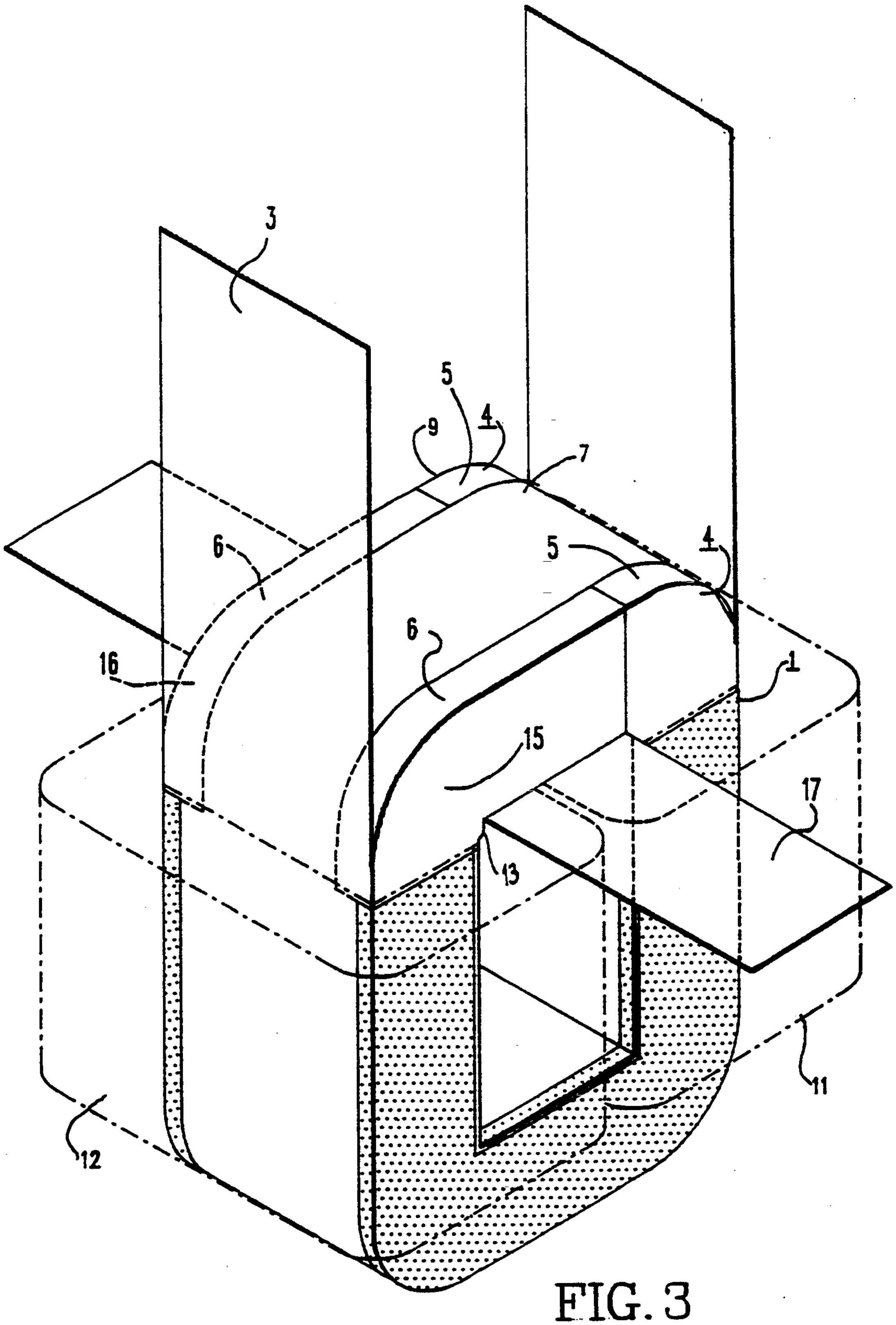
FIG. 3 shows the core of FIG. 2 with the cut leg in the process of being sealed.

In FIG. 2, legs 7 have been opened and are positioned in a vertical direction for the acceptance of coils. In FIG. 3, coils 11 and 12 have been placed over the longer legs of core 1 and cut legs 7 have been reclosed. By means of a support (not shown) for coils 11 and 12, a space 13 has been provided above and below the coils to prevent stressing of the amorphous metal from contact with the coils. A first porous material 4 has been placed over the exposed sides of the cut leg and the adjacent radii 15 and 16, on both sides. The first porous material 4 overlaps the exposed sides of legs 7, and the overlapped portions 5, 6 are secured by securing means. The securing means may be any material that withstands the environment of a transformer, such as adhesive, tape, and the like (not shown). The porous material may be preferably woven cotton cloth or paper.

A second porous material 17, similar or identical to the porous material 4, is passed through the window of core 1 and wrapped over the porous material 4 and the cut leg at the position of the cut and is secured to hold it in place.

Optionally, a third porous material may be placed along the length or top of the joint, in order to further enhance the properties of the porous material. The electrical steel jacket 3 is brought around the core 1 and the porous material 4, and 17 and is spot-welded.

The assembly is then placed into an oil-filled tank under vacuum, and is tested at high voltage. Should one of the coils 11 or 12 prove to be defective during the test, or, if the core is defective, the assembly is removed from the tank and the core or coil can be dismantled for repair or replacement. The cut leg 7 of the core can be opened as shown in FIG. 2 so that the defective coil or core can be removed and replaced. The procedure shown in FIG. 3 is then repeated to reseal the cut leg.

The porous material 4 and 17 permits air trapped in the core to be replaced with oil when the core is placed in oil under vacuum, but does not permit particles of amorphous metal to pass into the oil outside the coil. If the air pressure in the core is not relieved, it stresses the core and impairs its magnetic properties. Woven cotton cloth is preferred as the porous material. Other air-porous materials that can be used include glass cloth, polyester cloth, paper, and similar materials.

Any number of cores can be used in the transformer, and the invention is not intended to be limited to the two-legged core-form transformer shown in the drawings. For example, the invention is also applicable to shell-form transformers, where a single coil (having two or more windings) encircles the butted legs of two cores. The amorphous metal core need not be rectangular, but may have any other suitable shape, such as cruciform (rectangular, but with a circular cross-section) or torus (circular or oval with a rectangular or circular cross section). The amorphous metal core may consist of a single corelette, or of multiple corelettes where a transformer of greater width is desirable than the available width of amorphous metal. Amorphous metal is a commercially available material sold by Allied Signal Corporation under the trade designation "METGLAS" in a nominal thickness of about 1 mil and a width of about 1 inch to about 8 inches. It is generally made of iron, boron, and silicon, and typically contains about 80% (by weight) iron, 14% boron, and 4% silicon, and may also contain carbon, nickel, and other elements. It is prepared by rapidly quenching a thin sheet of metal (See U.S. Pat. No. 3,845,805, herein incorporated by reference, for additional information.) This invention is applicable to any type of transformer containing an amorphous metal core where the core is wound and cut, but the transformer is preferably a distribution oil-cooled transformer as the teachings of this invention are most applicable to this type of transformer.

Should the core or coil need to be replaced, the outer layer of electrical grade steel is opened. The porous material is unwrapped from around the core, allowing the cut leg to be opened. The defective coil is removed and replaced with another coil. The cut leg is closed, the porous material is fewrapped as detailed in FIG. 3, and the outer layer is applied and spot-welded.

It will be appreciated that we have developed a simple, quick, inexpensive method of manufacturing amorphous metal transformers. Porous material is wrapped around the cut leg of a transformer core to permit the flow of oil into the unit and resist the flow of amorphous metal pieces out of the unit. An outer layer of electrical grade steel encases the porous material and the core.

Whereas particular embodiments of the invention have been described above for purposes of illustration, it will be appreciated by those skilled in the art that numerous variations of the details may be made without departing from the invention as described in the appended claims.

We claim:

1. A method of repairing a transformer having an annealed wound amorphous metal core with a core joint in a cut leg thereof, wherein uncut legs of said core are at least partially covered with a substrate impregnated with a curable adhesive, a coil over each of said uncut legs that adjoins said cut leg, a porous material wrapping sides of said cut leg, said porous material being free of curable adhesive, and including an outer layer at least partially wrapping said porous material, said method comprising the steps of:

(a) opening said outer layer;

(b) unwrapping said porous material from said cut leg and adjoining radii;

(c) opening said cut leg;

(d) removing at least one of said coils, replacing said removed coil with another coil;

(e) closing said cut leg, rewrapping said cut leg and adjoining radii with said porous material; and (f) reclosing said outer layer.

2. A method according to claim 1 wherein said outer layer is electrical grade steel.

3. A method according to claim 1 wherein said core is rectangular, has a rectangular cross-section, and a coil is placed over each leg that adjoins said cut leg.

4. A method according to claim 1 wherein said porous material is woven cotton cloth.

* * * * *